Sept. 20, 1960 R. GRODT 2,953,674
TUBULAR ELEMENTS WITH INTEGRAL END FITTINGS AND METHOD OF MAKING
Filed Nov. 8, 1956 3 Sheets-Sheet 1
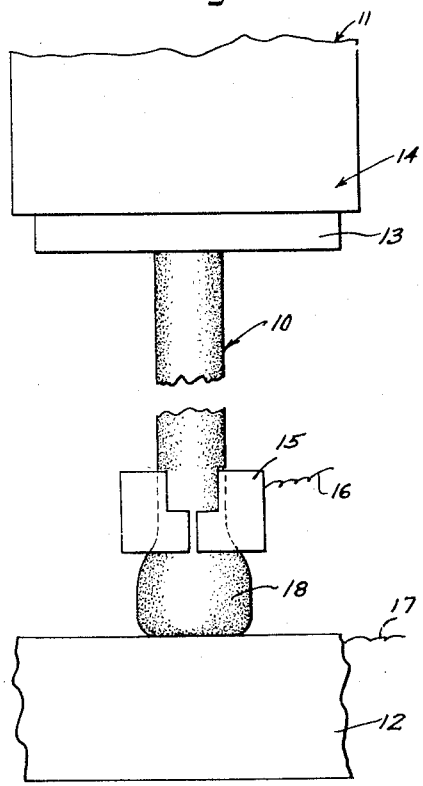
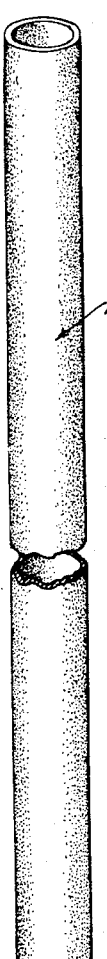
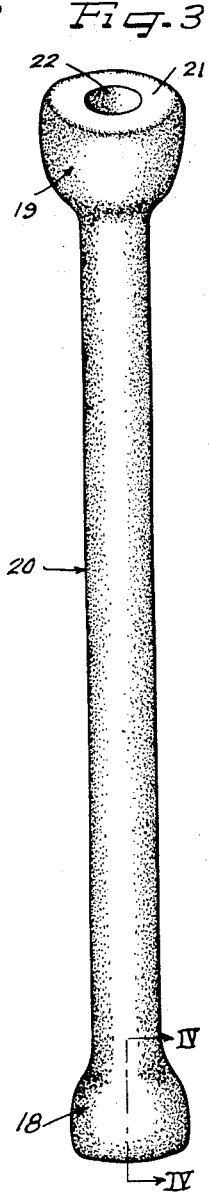
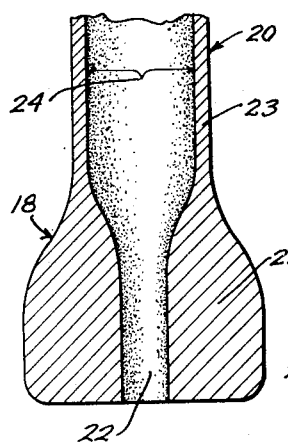
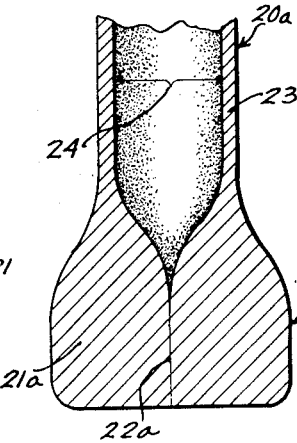
Inventor
RUDOLPH GRODT Sept. 20, 1960  R. GRODT  2,953,674
TUBULAR ELEMENTS WITH INTEGRAL END FITTINGS AND METHOD OF MAKING
Filed Nov. 8, 1956  3 Sheets-Sheet 2
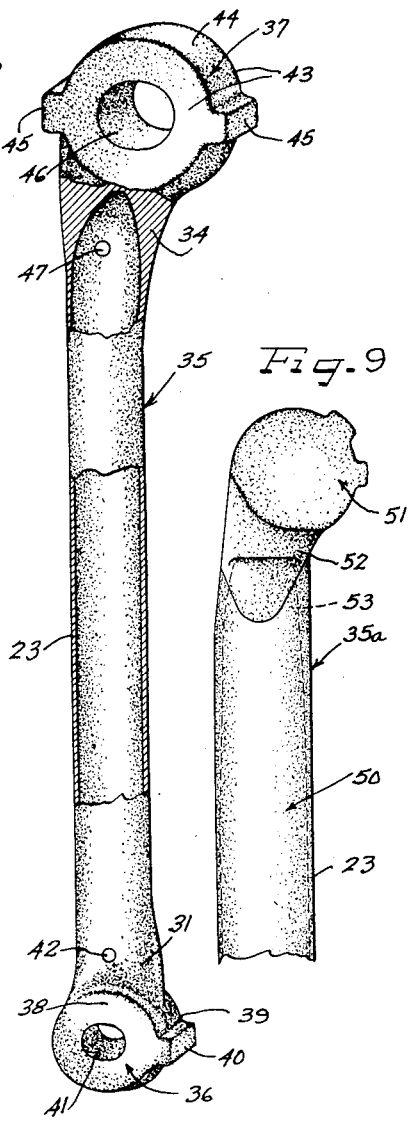
Inventor
RUDOLPH GRODT
by Hill, Sherman, Meroni, Gross & Simpson Attys.

Sept. 20, 1960 R. GRODT 2,953,674
TUBULAR ELEMENTS WITH INTEGRAL END FITTINGS AND METHOD OF MAKING
Filed Nov. 8, 1956 3 Sheets-Sheet 3
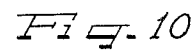
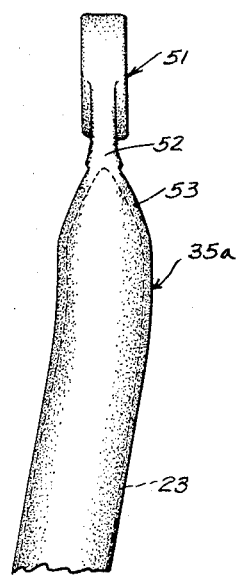
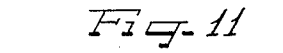
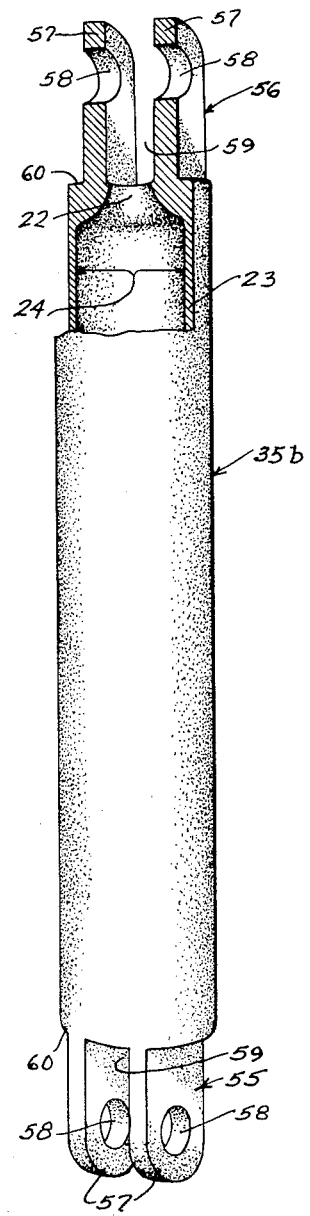
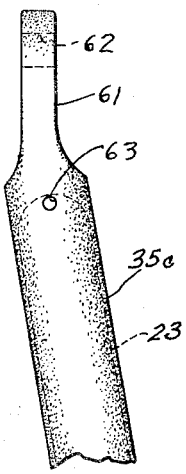
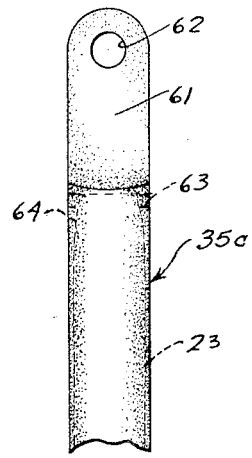
Inventor
RUDOLPH GRODT
by Hill, Sherman, Meroni, Gross & Simpson Attys.

United States Patent Office 2,953,674
Patented Sept. 20, 1960

2,953,674

TUBULAR ELEMENTS WITH INTEGRAL END FITTINGS AND METHOD OF MAKING

Rudolph Grodt, South Gate, Calif., assignor to Thompson Ramo Wooldridge Inc., a corporation of Ohio Filed Nov. 8, 1956, Ser. No. 621,125

6 Claims. (Cl. 219—152)

This invention relates to the production of tubular metal elements with integral end fittings and specifically relates to structural parts produced from metal tubes without heretofore required operations such as welding or brazing for securing end fittings thereon. The parts of this invention are especially adapted for control rods, struts, actuator pistons and the like structural elements for aircraft and automotive use.

Heretofore structural elements such as fulcrums, links, struts, control rods and the like, with fittings on the ends thereof, for connection to supports or other parts, have been formed from solid metal rods or bars or have been fabricated from such bars or tubes by welding or brazing the metal end fittings thereon. The solid rod or bar type of element, of course, is heavy and expensive. The tube type of element fabricated by welding or brazing separate end parts thereon is very expensive and weakened by welding defects and fabricating errors which are avoided in elements formed from a single piece rod or tube.

The present invention now provides strong, light-weight, tubular structural elements with integral end fittings thereby avoiding the expense and weight of the heretofore known solid metal elements and avoiding the expense and possible defects in the known tubular elements with welded or brazed end fittings thereon.

According to the present invention metal tubes having just sufficient wall thickness to carry the anticipated loads are subjected to gathering or upsetting operations to thicken the tube wall at one or both ends of the tube for supplying sufficient metal to form an end fitting of the desired strength and contour. The thickened tube end is subjected to forging and/or machining operations to provide the finished integral end fitting. This fitting can take the form of a finger, a clevis, an eye, a bearing support, or a plain or internally or externally threaded thickened stud. The amount of the upset or gather can be controlled accurately to supply the correct amount of metal for the desired end fitting. In some forms, the end fittings will be solid and closed off from the hollow tube interior. In other forms, the end fittings will communicate with the interior of the tube through a neck in the form of a tapered hollow pipe with walls gradually diminishing in thickness to the tube wall.

It is then an object of this invention to provide structural elements with hollow tubular main body portions and integral end fitting portions having thicker walls than the body portions.

Another object of the invention is to provide aircraft or automotive structural elements such as links, control rods, struts, and the like, from relatively thin-walled metal tubes wherein thick-walled integral end fittings provide increased strength and support for bearing pins and the like.

Another object of this invention is to provide light-weight, strong structural elements with integral end fittings from relatively thin-walled metal tubing.

A still further object of this invention is to replace heretofore known solid metal structural elements or welded-together structural elements with one-piece tubular elements having thickened integral end portions affording added strength.

Another specific object of this invention is to provide tubular structural elements with thick-walled integral end fittings composed of metal upset from the tube walls and shaped by forging and/or machining.

Another object of the invention is to provide a method of making structural elements with integral end fittings by upsetting the ends of relatively thin-walled metal tubes to gather sufficient metal at the ends of the tubes and to then forge this gathered metal into the desired fitting contour.

A still further object of this invention is to provide a method of making tubular metal structural elements with integral solid end fingers having pin bearing apertures.

Other and further objects of this invention will be apparent to those skilled in this art from the following detailed description of the annexed sheets of drawings which, by way of preferred examples only, illustrate several embodiments of this invention and the method of making the structural elements of the invention.

On the drawings:

Figure 1 is a fragmentary, broken, somewhat diagrammatic, elevational view of a metal tube in an electric gathering machine to produce a thickened end thereon in accordance with the invention.

Figure 2 is an isometric view of a thin-walled metal tube from which structural elements of this invention are made.

Figure 3 is an isometric view of the tube of Figure 2 with the ends thereof upset to provide sufficient metal for end fittings.

Figure 4 is an enlarged, fragmentary, longitudinal, cross-sectional view of one end of the tube of Figure 3 taken along the line IV—IV of Figure 3.

Figure 5 is a view similar to Figure 4 but showing the tube end wherein the upsetting or gathering operation has continued beyond the stage shown in Figure 4 to form a solid end.

Figure 6 is a view of the tube of Figure 3 with the top end thereof offset to position the fitting to be formed therefrom at an angle relative to the axis of the tube.

Figure 7 is a view of the blank of Figure 6 after a forging operation flattening the gathered or upset ends of the tube into solid portions.

Figure 8 is a view of a finished element made from the blank of Figure 7 but shown partly in axial section and illustrating the flattened ends with apertures punched or drilled therethrough and also illustrating apertures in the body of the tube inwardly from these ends.

Figure 9 is a fragmentary plan view of one end of a modified structural element according to this invention.

Figure 10 is a fragmentary, side elevational view of the end of the element shown in Figure 9.

Figure 11 is a perspective view with parts broken away and shown in axial section, of another modified structural element according to this invention wherein the integral end fittings are in the shape of a clevis.

Figures 12 and 13 are side and plan views respectively, of an end portion of another form of structural element according to this invention.

As shown on the drawings:

According to this invention, a relatively thin-walled, hollow metal tube 10, shown in Figures 1 and 2, is placed in an electric gathering machine 11. The thickness of the hollow tube, of course, can vary but the process of this invention is especially useful for shaping relatively thin-walled tubes having a wall thickness of .015 to .125 inches. The machine 11 has a bottom anvil 12 on which the bottom end of the tube 10 is supported. The top end of the tube is acted upon by the piston 13 of a hydraulic ram 14 to compression load the tube in an axial direction. An electrode 15 is clamped around the tube in spaced relation above the anvil 12 and is electrically energized through a suitable cable 16. The anvil 12 or at least a portion of the anvil supporting the bottom of the tube 10 is also electrically energized through a cable 17. The portion of the tube between the clamp electrode 15 and the anvil 12 is thereby heated by electrical resistance, to a plastic state whereupon the compression load applied by the hydraulic ram 14 will upset the end of the tube to form a head 18 thereon. The upsetting operation is continued until the head 18 has sufficient metal gathered therein to form the desired end fitting on the tube. The application of electricity and heat to the tube is, of course, terminated as soon as the desired upsetting is accomplished and the tube has had the desired increase in radial thickness and increase in diameter.

If the structural element to be produced from the tube 10 is to have end fittings on both ends thereof, the tube 10 is reversed in the machine 11 after the head 18 is formed thereon and a similar or different head is formed on the other end of the tube thereby producing a blank 20 shown in Figure 3 having the above described head 18 at one end thereof and a second head 19 at the other end thereof. It will of course be recognized that in some instances both ends of the tube may be formed at the same time. The upsets or heads 18 and 19 of the blank 20 have thick walls 21 with an aperture or pipe 22 through the center thereof as best shown in Figure 4. As therein shown, it will be noted that the wall 21 of the head 18 has many times the thickness of the original tube wall 23 and the pipe 22 is of smaller diameter than the original internal diameter 24 of the tube. The thick end walls 21 are solid, free from laps or voids and can be of any desired thickness.

If it is desired to close the pipe or hole 22 in the blank 20, the upsetting operation can be continued to produce a modified blank 20a wherein the end head 18a thereof has thicker walls 21a than the walls 21 of the head 18 and wherein the pipe 22 is reduced to a line 22a. At the same time, the original tube diameter 24 and the original tube wall thickness 23 is maintained.

The thick wall 21 or 21a merges into the thin wall 23 along smooth neck portions of diminishing thickness whereby the mass of the end head is gradually reduced to the original wall thickness. This gradually tapered neck portion or gradual reduction in thickness is highly desirable to eliminate sharp shoulders which might form loci for fatigue cracks and to gradually blend the end fitting into the body of the tube.

As shown in Figure 6, the blank 20 of Figures 3 and 4 is subjected to an offsetting operation to produce a second stage blank 25 with the end head 18 in its original position but with the top end head 19 offset from the axis of the tube. This offsetting operation is effected by a suitable hammer or forging press to position the end head 19 as desired for forming the final fitting from this end head.

The blank 25 with the offset end head 19 is next subjected to a forging operation to produce the blank 26 of Figure 7. In the blank 26, the bottom end head 18 is converted to a solid flattened disk-like knob 27 while the top end head 19 is converted to a solid flattened disk-like knob 28. The flat faces of the ends 27 and 28 are parallel with each other and the peripheries of each head are generally cylindrical. The head 27 thus has a generally cylindrical periphery 29 with a single radially extending lug 30 thereon projecting at right angles from the axis of the blank. The neck portion of the original head 18 forms a blending neck 31 joining the forged head to the main body of the tube. The end head 28 has a cylindrical periphery 32 with a pair of radially extending lugs 33 thereon in diametrically opposed relation and at right angles to the axis of the tube. The neck of the original head 19 forms a blending portion 34 joining the head 28 into the body of the tube.

The forged blank 26 of Figure 7 is next subjected to a punching or machining operation to produce the finished structural element 35 of Figure 8. This element 35 has a small diameter eye end 36 at the bottom end thereof and a large diameter eye end 37 at the top thereof respectively formed from the heads or knobs 27 and 28 of the blank 26.

The eye end 36 has flat faces 38, a cylindrical peripheral wall 39 between these flat faces, a single radially extending lug 40 on the wall 39 and a cylindrical hole or aperture 41 therethrough terminating in the flat side faces. The original neck portion 31 of the blank 26 is retained and, of course, the original tubular contour and wall thickness 23 of the original tube 10 is retained. A hole 42 is drilled through the neck portion 31 to vent the hollow tube interior.

The eye end 37 has opposite flat faces 43, a cylindrical peripheral wall 44 between these flat faces, a pair of diametrically opposed radially extending lugs 45 on the wall 44, and a cylindrical aperture or hole 46 therethrough between the end faces 43. The original neck 34 is preserved and a hole 47 is drilled through this neck to vent the interior of the tube.

The apertures 41 and 46 are adapted to receive bearing pins or the like and the metal surrounding these apertures is solid to afford a good bearing support for the pins.

Thus, the structural element 35 has a thin-walled hollow tubular main body portion with integral solid massive eye ends affording increased strength for bearing pins and the like. These massive ends 36 and 37 taper and blend into the thin-walled main tubular body portion along diverging neck portions 31 and 34 of gradually diminishing thickness wherein the massive metal gradually thins down to the tube wall thickness 23 as illustrated in Figures 4 and 5. No abrupt changes in metal thickness are encountered. The eye end 37 is offset from the axis of the tube. The element 35 is suitable for use as linkage in aircraft, is light in weight, is free from defects and is an integral one-piece structure.

A modified structural element 35a is shown in Figures 9 and 10. This element can be made according to the same method described in connection with the element 35 of Figure 8. The modified element 35a has a main hollow tubular body 50 of the same wall thickness 23 as the original tube 10 but the end head 51 thereon is thinner than the end heads 36 and 37 while the neck 52 is flat and closed and blends into the hollow tube along a thin-walled tube section 53. Thus, the end 51 is connected to the hollow tube body 50 by a solid flattended neck portion diverging into the tube wall. The end head 51 can be formed from a solid end head 18a of the blank 20a and can be offset from the axis of the original tube as desired.

The further modified structural element 35b of Figure 11 is also formed from an original thin-walled tube 10 according to the method illustrated in Figures 1 to 6 without, of course, offsetting one of the ends. As shown, the element 35b has clevis ends 55 and 56 each with solid clevis fingers 57 having aligned transverse holes 58 therethrough near their ends. The fingers 57 are formed by machining out a central slug from end heads of the tubular blank to provide the clevis gap 59 between the fingers. The outer faces of the fingers are flat-machined. This outer machining produces flat shoulders 60 at the base of the fingers which are somewhat abrupt but it will be noted that the original tapered contour of the interior is maintained so that the original pipe or hole 22 of the blank diverges from its reduced diameter portion to the major diameter 24 of the original tube.

The further modified element 35c of Figures 12 and 13, illustrates another finished product produced according to the method illustrated in Figures 1 to 6. This modified element 35c has the original thin wall 23 of the tube 10 and an end head or solid finger 61. This solid finger 61 is formed by flattening the head 18 or 18a of an upset tube blank such as is shown in Figures 4 or 5 to completely close the pipe or reduced diameter hole 22. An aperture 62 is then punched or drilled through the end portion of the finger between the flat faces thereof and the thin wall of the tube 23 is drilled at 63 to vent the interior of the tube adjacent the solid end finger 61.

As shown in Figure 12, the end finger 61 is at an angle relative to the axis of the main body of the tube and any desired angular or axial relation can be provided. It will also be noted that the solid finger 61 is thinner than the overall diameter of the tube and merges into the main tube diameter along a gradually thickening solid neck portion 64. The flat faces of the finger 61 can be machined.

From the above descriptions it will, therefore, be understood that this invention provides strong, lightweight structural elements with hollow main tubular body portions and solid or massive integral end fitting portions by a method including the upsetting or gathering of the ends of the tube to supply sufficient metal for the desired end fittings.

It will be understood that variations and modifications may be effected without departing from the scope of the novel concepts of this invention.

I claim as my invention:

1. The method of making structural elements with integral end fittings from relatively thin-walled tubing which comprises heating at least one end portion of thin-waller metal tube to a plastic state, applying an axial end pressure to the end of the plastic end portion of the tube to reduce the axial length and increase the radial thickness of said portion for producing a mass of metal on the end of the tube which is thicker than the original wall thickness of the tube, shaping the mass of metal into the configuration of a desired end fitting on the tube, and blending the thickened end fitting portion into the tube along a neck portion which gradually diminishes in thickness to the original tube wall thickness.

2. The method of making structural parts with integrally designed ends from thin-walled tubing which comprises heating the end portions of a thin-walled metal tube to plastic state, compression loading the tube in an axial direction to upset the plastic portions thereof and enlarge the tube and gather metal during the upset for producing thick-walled ends on the tube merging into the original thin wall of the tube along a gradually diverging neck portion, and shaping the thick-walled ends of the tube into contours desired for end fittings.

3. The method of making structural parts with integral fitting ends which comprises electrically heating the opposite end portions of a thin-walled metal tube to plastic states, compression loading the tube in an axial direction to upset the plastic portions and gather metal into massive thick-walled enlarged heads on the ends of the tube, controlling the gathering of the metal to blend the thick-walled ends into the original thin-wall tube along smoothly diverging neck portions, forging said massive heads into solid shapes of desired configuration, and preserving said diverging neck portions of the tube during said forging to blend the thin tube walls into the forged ends.

4. The method of making links which comprises heating and upsetting the ends of a thin-walled metal tube to provide thick heads on said ends, controlling the upsetting operation to blend the thick heads into the original tube wall thickness along neck zones of smooth contour diminishing gradually in thickness, forging the upset ends into solid heads without destroying said neck portions, and shaping said solid heads to provide fittings of desired contours.

5. The method of making tubular structural elements with massive integral end fittings which comprises cutting a tube to a length substantially greater than the desired length of the desired structural element, electrically heating both ends of the tube, compression loading the tube in an axial direction, upsetting the heated ends to gather metal from the tube wall into said ends for increasing the wall thickness of the ends while reducing the length of the tube to the desired element length, forging the massive ends of the tube to work the thick-walled portions into desired fitting shape, and blending the fitting shapes into the thin-walled tube along neck portions of gradually diminishing thickness.

6. The method of making links especially adapted for aircraft which comprises upsetting the ends of thin-walled steel tubing to form massive thick-walled heads on the tubing, blending said heads into the thin-walled tubing along neck portions of gradually diminishing thickness, and forging the heads into fitting shape.

References Cited in the file of this patent

UNITED STATES PATENTS

| | | |
|---|---|---|
| 1,210,708 | Schwentler | Jan. 2, 1917 |
| 1,416,188 | Garman | May 16, 1922 |
| 1,867,936 | Benedetto | July 19, 1932 |
| 2,328,742 | Rogers et al. | Sept. 7, 1943 |
| 2,473,245 | Hanna | June 14, 1949 |
| 2,495,060 | Hanna | Jan. 17, 1950 |
| 2,625,635 | Westin et al. | Jan. 13, 1953 |

FOREIGN PATENTS

| | | |
|---|---|---|
| 500,273 | France | Dec. 12, 1919 |